Oct. 31, 1950
O. L. GARRETSON
HYDRAULIC PUMPING UNIT
Filed Nov. 28, 1947
2,528,131
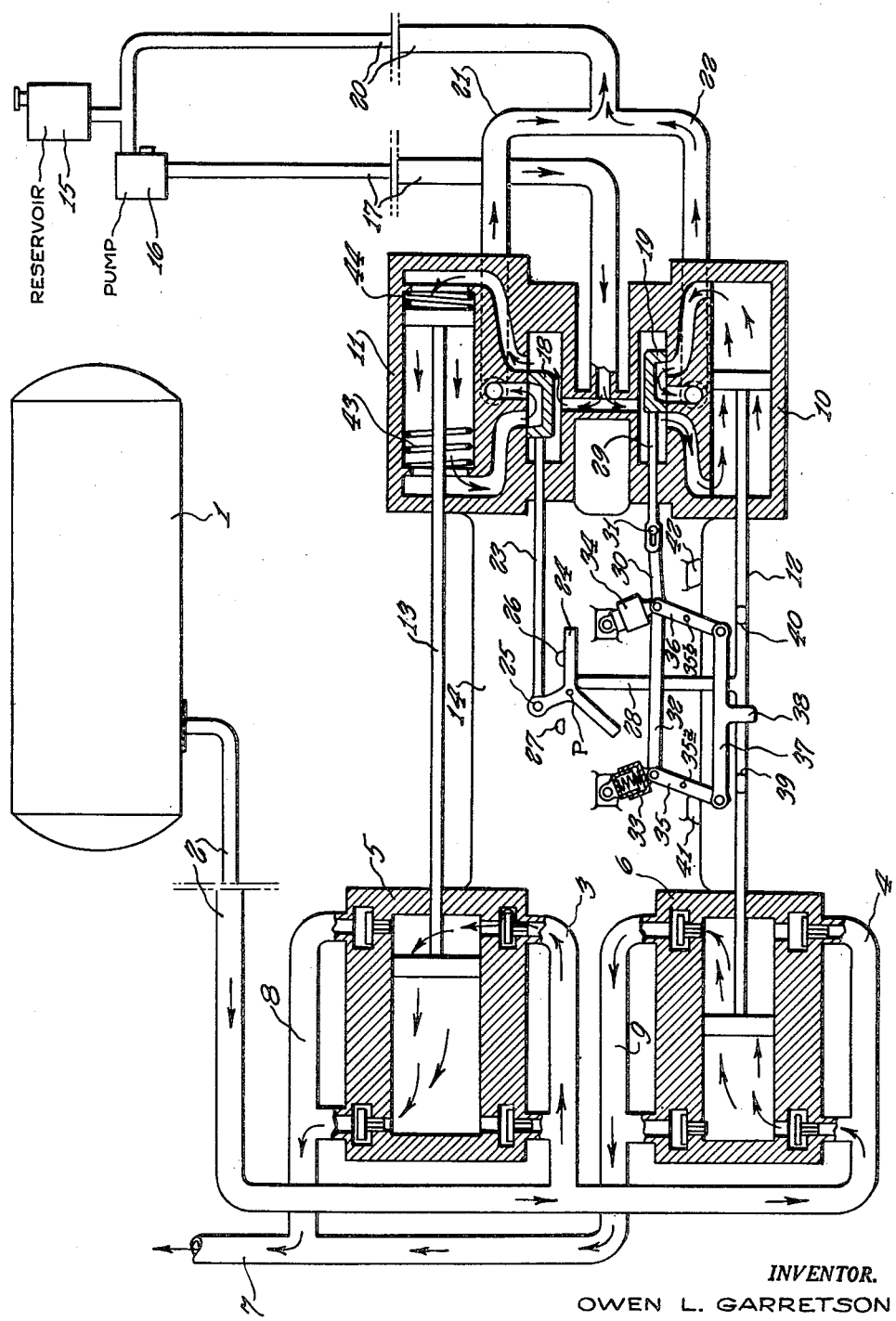
INVENTOR.
OWEN L. GARRETSON
BY Darby & Darby
ATTORNEYS Patented Oct. 31, 1950

2,528,131

UNITED STATES PATENT OFFICE 2,528,131

HYDRAULIC PUMPING UNIT

Owen L. Garretson, Roswell, N. Mex., assignor to Phillips Petroleum Company, a corporation of Delaware Application November 28, 1947, Serial No. 788,363

9 Claims. (Cl. 103—49)

This invention relates to pumping systems. In a specific application thereof it relates to a pumping system for a tank on a trailer having a pump thereon adapted to be tractor-drawn and arranged so that the pump is driven from the motor of the tractor.

It is customary in handling large quantities of fluid such as liquefied petroleum gas to transport the fluid in a tank mounted on a trailer which is pivoted to and drawn by a tractor. In order to transfer such fluid from the trailer tank it is necessary to employ a pump which is preferably mounted as close to the tank as possible so as to thereby require short connections. Practice also makes it desirable that these connections be near the rear end of the tank and thereby as far from the tractor as possible to avoid accidental ignition of any escaping gas.

The use of such systems generally has been the source of some difficulties, especially with regard to the pumps and related systems commonly used. It is not desirable to drive the pump by means of an electric motor and so the preferable practice is to operate the pump from the engine of the tractor. This solution to the problem is complicated with the trailer type truck as the tank trailer pivots relative to the tractor which hauls the trailer.

Various expedients have been proposed for solving this problem but in most cases they have not proved practical because of the violation of safety requirements and the necessity for employing complicated mechanical systems which do not stand up well in service.

In accordance with this invention a novel form of pumping unit is provided, actuated by means of a pressurized hydraulic system, of which a pump which can be mounted on the tractor and driven from the engine thereof is a part.

An object of this invention is to provide such a system in a form which does not require a complicated crankcase and gear system for driving the hydraulic pump.

Another object of the invention is to provide a pumping unit which can be driven by a hydraulic pump so as to have a uniform discharge rate eliminating the need of surge chambers now commonly used.

Another object of the invention is to provide a pumping unit by means of which the maximum discharge pressure can easily be controlled, eliminating the need for a bypass regulator commonly used on the discharge line of pumps employed in such combinations.

Another object of this invention is to provide a novel form of pumping unit employing reciprocating pistons which is capable of operating at practically constant discharge volume.

A more specific object of the invention is to provide a pumping unit combination made up of two pumps and two motors, each of which employ a reciprocating piston in which the pistons are so interconnected that the pumps have a constant discharge volume when operated by a constant volume hydraulic pump.

A still more specific object of the invention is to provide an arrangement in such a system in which the pumps and motors are arranged in interconnected pairs and operated so that the piston pairs operate so as to be out of phase but capable of varying their phase relation but not to exceed 90° phase displacement so as to deliver a constant flow of fluid being pumped.

A still more specific object of the invention is to provide in such a system an arrangement wherein the pistons of the two pumps operate in relation to each other so that the inherent variations in their speeds of movement are so related so that together their output is of constant volume.

Other and more detailed objects of the invention will be apparent from the following description of the embodiment thereof illustrated in the attached drawing.

This invention resides substantially in the combination, construction, arrangement and relative location of parts all as will be hereinafter described.

In the accompanying drawing the figure is a diagrammatic and schematic illustration of the system of this invention showing some parts thereof in cross section.

A brief description of the elements of the combination will be helpful in studying the operation and advantages thereof. The tank containing the ultimate fluid to be pumped, such as liquefied petroleum gas, is illustrated at 1. This is, of course, the tank which is mounted on the trailer. The fluid to be pumped is withdrawn therefrom through the line 2 and is delivered by its branches 3 and 4 to the valved intake ports of the pumps 5 and 6, respectively. The main delivery line 7 is connected to the valved discharge ports of these pumps by means of the branches 8 and 9, respectively.

Axially aligned with the cylinders of these pumps are the hydraulic motors 10 and 11. The pumps and motors are arranged in aligned pairs as shown and secured together for example by means of a main supporting frame 14, diagrammatically illustrated. The pistons of the pumps and motors are respectively connected together in pairs as shown by means of the rigid piston rods 12 and 13. In other words, the pump 6 and the piston of the motor 10 are united by the connecting rod 12 and likewise the pistons of pump 5 and motor 11 are connected by means of a rigid piston rod 13.

At 15 is diagrammatically illustrated a reservoir for the hydraulic fluid for operating the motors 10 and 11. The intake port of a constant volume pump 16 is connected to the reservoir 15 and its delivery port is connected by a line 17 to the inlet ports of the motors 10 and 11. The exhaust ports of these motors are connected by means of a pipe 20 and its branches 21 and 22 to the reservoir 15 and the inlet of pump 16.

The supporting of the motors 10 and 11 is the usual arrangement for double acting reciprocating engines of this type and the connections within the motors are controlled by the valves 19 and 18, respectively, as shown. Valve 18 is operated by means of a rigid rod 23 which is pivotally connected at 25 to a Y-shaped yoke 24, pivotally mounted at P on the frame 14. The yoke 24 is adapted to oscillate between two extreme positions determined by the stops 26 and 27 on the frame 14.

Oscillation of the yoke is effected by means of an arm 28 forming a rigid lateral extension on the piston rod 12. The valve 19 is provided with a rigid rod 29 having a lost motion connection 31 with a link 30. There is provided a pivotally interconnected linkage system in the form of a parallelogram comprising the links 32, 35, 36 and 37. As shown, one corner of the parallelogram is pivotally connected to the link 30 and to an over center spring biasing arrangement 34. An adjacent corner of the parallelogram is pivotally connected to a similar spring arrangement 33. As shown, the biasing spring assembly comprises a pair of telescoping members forming a housing for a compression spring therein, with one member of each pair pivotally connected to the parallelogram linkage and the other pair pivotally mounted on the frame 14. The link 37 has a lateral projection 38 arranged to be engaged by a pair of projections or shoulders 39 and 40 on the piston rod 12. The frame 14 is provided with a pair of fixed stops 41 and 42 arranged to limit the movement of the parallelogram linkage in either direction.

Within the cylinder of motor 11 at opposite ends are a pair of cushioning springs 43 and 44.

The arrangement of this equipment can be such that the pump 16 will be mounted on the tractor and connectable by a suitable and simple drive to the tractor engine. The reservoir 15 will preferably but not necessarily be mounted on the tractor. The pumping unit is mounted on the trailer with respect to the tank 1 also mounted thereon in any available position subject to the safety requirements mentioned above. Thus, the supply line 2 to the pumping unit can be short and fixed, a desirable safety feature. The pump 16 may be connected to the pumping unit by means of suitable flexible hose connections which will be necessary in view of the pivotal connection between the trailer and tractor. There is little or no danger from breakage in the lines 17 and 20 because a non-inflammable or relatively non-inflammable fluid may be used in these lines.

In the operation of this system with the pump 16 operating at a constant rate, fluid will be supplied to the engines 10 and 11 under suitable pressure by way of line 17, valves 18 and 19 and the ports and passages of the engines. Fluid will be returned from these engines to the pump 16 and of course the reservoir being connected to the intake will keep the intake line of the pump full.

The description of the operation of the pumping unit will be started with conditions as illustrated in the drawings. It will be seen that the driving fluid will pass into the right hand end of engine 11 as illustrated and into the left hand end of engine 10 as illustrated. The opposite ends are exhausting through the respective valves to line 20. Under these conditions, it will be seen that the piston of engine 10 is moving to the right and is at the approximate center of the cylinder and in this position is moving faster than the piston of cylinder 11 which is just beginning its stroke and moving toward the left hand end. As is well understood in the operation of these engines when employing an incompressible driving fluid the pistons thereof move faster when in the region of the center of the cylinder and slow down in their movement as they reach either end thereof. Likewise, they start up slowly from either end until they reach their fastest movement at the center of the cylinder. The pistons of the pumps 5 and 6 are of course so connected to the pistons of the motors that they have the same rates of movement. Thus, in the arrangement as illustrated the piston of pump 5 is just starting up, drawing fluid from the tank 1 through the branch 3, and forcing fluid previously drawn into the cylinder at the left therefrom into the branch 8. Simultaneously, the piston of pump 6 is drawing fluid from the branch 4 and is forcing fluid from the right hand end of its cylinder into branch 9. The piston of pump 5 is thus supplying fluid to line 7 at a slower rate than is the more rapidly moving piston of pump 6. The pistons of the respective pairs are approximately 90° out of phase. As the action continues the pistons of the set 5—11 will increase their speed of movement while the pistons of the set 6—10 will reduce their speed of movement. The phase displacement of the piston sets will decrease but will ultimately return towards a maximum displacement of 90°, a condition represented when one set of pistons is at the end of its stroke and the other set is at the center of its stroke. Therefore, the total output of the two pumps will remain substantially constant, the one pump increasing its rate of discharge in approximately the same proportion that the other pump decreases its rate of discharge. When the piston set of pump 6 and engine 10 about reaches the end of its stroke towards the right, the valve 19 will be shifted to the left to its other position. When the projection 39 of piston rod 12 engages the lug 38 on the linkage system it will begin to shift the linkage system, about its pivoted supports 35ª and 35ᵇ. This will cause the link 30 to move to the left and the over center biasing spring assemblies 33 and 34 to pivot clockwise. However, valve 19 will not be disturbed until the lost motion at 31 is taken up. This lost motion will be taken up by the time the piston assembly connected to piston rod 12 approximates the end of its stroke to the right. Just as it completes its stroke points on a pivotal connection of the biasing springs with the linkage system will have swung counterclockwise to a point where they are just going over center with the result that the linkage system will complete its stroke in the direction it was urged by the projection 39, causing valve 19 to shift to its other position with a snap action. During this portion of the stroke of piston rod 12 the projection 28 thereof will ride along the parallel arm of the yoke 24 so that valve 18 will remain in the position shown. The pistons of the set 5—11 will be about in the center of their cylinders at the time valve 19 snaps over. The operation of valve 19 will switch the supply of pressure fluid from the left hand end of engine 10 to the right hand end causing it to start up in the opposite direction. The linkage system is biased against stop 42 so that valve 19 will remain in this operated position until disturbed therefrom by the engagement to stop 40 with the lug 38. The pistons of the set 5—11 continue their movement to the left and as they reach the end of their stroke in that direction, the yoke 24 will be operated from the position shown to its other position by the extension 28 of piston rod 12 as the pistons of the set 6—10 reach about the center of their cylinders. This rotation of the yoke 24 on its pivot P until terminated by the stop 27 will cause valve 18 to shift to its other position so that pressure fluid is now supplied to the cylinder of engine 11 at its left hand end. It will be apparent that if motor 11 reaches the end of its stroke before motor 10 reaches the middle of its stroke motor 11 will stop in that position and wait until motor 10 reaches the middle of its stroke because it is at this point that extension 28 causes the operation of yoke 24.

Upon consideration, it will be seen that the inherent tendency of the piston of a reciprocating engine to move more rapidly near the center of its stroke will be enhanced by the fact that as the piston of one of the motors approaches the end of its stroke in either direction, the piston of the other motor will be speeded up by reason of the fact that the hydraulic fluid is being supplied to the motors at constant volume and thus as the requirement of one motor for fluid is reduced, there will be an increase in the supply of operating fluid to the other motor, making it go faster and thus make up in the delivery line 7 for the decrease of fluid supply thereto from the other pump. The inherent nature of such a combination is such that a substantially constant flow of pumped fluid with little or no pressure variation will take place in the delivery line 7.

The springs 43 and 44 are provided when necessary to cushion the piston, that is, they act as shock absorbing means.

It will be recognized that this system can only function in the manner described when using a substantially non-compressible operating fluid in the circulatory system of pump 16. It is of course also necessary that the parts be constructed in proportion so that the engine pistons must reach the end of their strokes before their direction is reversed.

By adjusting the discharge pressure of the hydraulic supply pump 16 it is possible to control in a simple manner the maximum discharge pressure of the pumps 5 and 6, thereby eliminating the need for the bypass regulator now commonly used in the discharge line of pumps of this type, especially as used in liquefied petroleum gas pumping systems.

Those skilled in the art will understand that the disclosure of the use of the cushioning springs 43 and 44 illustrate the principle that cushioning of the piston of the engine 11 is desirable but that other types of cushioning means may be employed. In an actual installation hydraulic cushioning is preferred. For example, as is well known in the art, provision can be made to divert the exhaust from the engine through an adjustable restricted port near the end of the stroke whereby the rate of exhaust is retarded and the piston cushioned as it completes its stroke. Hydraulic cushioning means which are known in the art in many specific means are preferable for this purpose.

The other advantage of this system, especially when applied to the environment referred to herein for illustrative purposes, have already been detailed. It will be understood of course that the pumping unit herein disclosed is not limited in its application to liquefied petroleum gas systems, either portable or stationary, but may be used in any field where the characteristics of this system would be useful.

I do not therefore desire to be strictly limited to the disclosure as herein given for illustrative purposes and also for the reason that many changes may be made in the details of the construction without departing from the novel subject matter herein set forth. I desire therefore to be limited only as required by the appended claims.

What is claimed is:

1. A pumping unit having a substantially constant discharge volume comprising a pair of reciprocating pumps, a pair of reciprocating engines, the piston of one pump being connected to the piston of one engine and the piston of the other pump being connected to the piston of the other engine, a valve for each engine for controlling the supply and exhaust of pressure liquid therefor, means for supplying a liquid under pressure in constant volume to both of said engines under the control of said valves, and means actuated by the piston assembly of one pump and engine pair for operating both of said valves to control the operation of said engines whereby said pumps operate conjointly at substantially constant discharge volume.

2. In the combination of claim 1, said last means including a spring biased over-center linkage mechanism causing one of said valves to operate with a snap action.

3. In the combination of claim 1, said last means including valve operators and an actuator to operate one valve when the piston of the engine associated therewith reaches the end of its stroke in either direction, and an actuator to operate the other valve when said same piston reaches center position.

4. In the combination of claim 1, said means for supplying liquid under pressure involving a constant volume pump connected to both engines so that the rate of supply of fluid pressure to one engine increases as the rate of supply to the other decreases.

5. In the combination of claim 1, said means for supplying pressure liquid to the engines consisting of equal capacity supply connections to both engines controlled by said valves.

6. In a substantially constant volume pump, the combination comprising two pumping sets each composed of a reciprocating pump and a reciprocating engine having their pistons connected together, a valve for each engine for controlling the supply to and exhaust therefrom of a pressure liquid, means for supplying a liquid under pressure to both of said engines simultaneously, a source of liquid to be pumped, said pumps each having a pair of valved inlet and outlet ports, a connection from said source to the inlet ports of both pumps, a fluid delivery line connected to the outlet ports of both pumps, and means actuated by the piston assembly of one set for effecting alternative operation of the valves of said engines, whereby said pumps discharge liquid at constant volume to said delivery line.

7. In the combination of claim 6, said last means including a member for actuating the valve of one engine when the piston assembly of the engine reaches mid-position from either direction.

8. In the combination of claim 6, said last means including a member for actuating the valve of one engine when the piston assembly of the engine reaches mid-position from either direction, and including a member for actuating the valve of the other engine when its piston assembly is near the end of its stroke in either direction, including over-center bias means to cause snap action of said last valve.

9. In a substantially constant discharge volume pumping system the combination comprising two pumping sets each composed of a reciprocating pump and reciprocating engine having their pistons connected together, a valve for each engine for controlling the supply to and exhaust therefrom of a pressure liquid, means for supplying a constant volume of liquid under pressure to both engines simultaneously, an operator for the valve of one engine including a pivotally mounted yoke, an operator for the valve of the other engine including a spring biased over-center mechanism, and means actuated by one pumping set for causing pivotal movement of said yoke and for actuating said over-center mechanism alternatively.

OWEN L. GARRETSON.

REFERENCES CITED

The following references are of record in the file of this patent:

UNITED STATES PATENTS

| Number | Name | Date |
|---|---|---|
| 526,429 | Worthington | Sept. 25, 1894 |
| 626,652 | Dean | June 6, 1899 |